(12) United States Patent
Brown

(10) Patent No.: US 8,725,591 B2
(45) Date of Patent: May 13, 2014

(54) METHOD OF REUSING ADVERTISING MATERIAL

(76) Inventor: Jillian Brown, Fort Salonga, NY (US)

( * ) Notice: Subject to any disclaimer, the term of this patent is extended or adjusted under 35 U.S.C. 154(b) by 0 days.

(21) Appl. No.: 13/421,869

(22) Filed: Mar. 16, 2012

(65) Prior Publication Data

US 2013/0246194 A1    Sep. 19, 2013

(51) Int. Cl.
G06Q 30/00    (2012.01)
G06Q 30/06    (2012.01)

(52) U.S. Cl.
CPC .................. *G06Q 30/0621* (2013.01)
USPC ........................................ 705/26.5

(58) Field of Classification Search
CPC ................................. G06Q 30/0621
USPC ........................................ 705/26.5
See application file for complete search history.

(56) References Cited

U.S. PATENT DOCUMENTS

2008/0243640 A1* 10/2008 Paretta ............................. 705/27
2011/0320360 A1* 12/2011 Murray ............................ 705/80

OTHER PUBLICATIONS

Lisman, Megan "Event Banners Get New Life as Retro-Actif Fashion Accessories", www.blueplanetgreenliving.com, Jun. 15, 2009, 4 pages.*
"Handbag Designer 101", www.handbagdesigner101.com, downloaded Nov. 19, 2012, 1 page.*
"WAS Recycled Fashion, high fashion bags from billboards, recycled products for gifts", www. was.co.nz/default.asp, copyright 2005, 1 page.*
Smithsonian, National Air and Space Museum, "Apollo Moon Rocks", downloaded Nov. 20, 2012, 1 page.*

* cited by examiner

*Primary Examiner* — James W Myhre
(74) *Attorney, Agent, or Firm* — Harold G. Furlow, Esq.

(57) ABSTRACT

The present disclosure describes a method of reusing advertising material that includes selecting a reused advertising material that was once displayed on a billboard and selecting product that includes the reused the advertising material. The reused advertising material has attributes that include a defined subject matter, the location where the advertising material was displayed and the date of display of the advertising material. The product includes a certification of the attributes identified for the advertising material included in the product.

20 Claims, 3 Drawing Sheets

METHOD OF REUSING ADVERTISING MATERIAL

BACKGROUND OF THE INVENTION

1. Field of the Invention

This disclosure relates to methods of reusing advertising material and in particular to reusing billboard advertising material for useful products that can be promoted through the attributes associated with the advertising material.

2. Description of the Related Art

Advertising materials are commonly shown on billboards of varying sizes as printed advertising materials. Once the advertising material completes its period of display, it is removed from the billboard and in many instances simply discarded. A small industry does exist that recycles billboard advertising materials into products such as bags and purses. These recycled advertising materials, however, lose the original advertising subject matter or theme in their recycling process. This loses a potentially valuable association between the subject matter of the advertising material and the reuse of the advertising that can be attractive to consumers. Further, some of these advertising materials have been displayed in prominent places in major cities, which can add to their unique qualities and merchandizing potential.

The method described herein provides a buyer the ability to select a reuse product based on commercially desirable attributes of the billboard advertisement material used in the making of the reuse product. These attributes include the advertising subject matter, images in the advertising, the place or location in which the advertising was displayed and/or the date(s) the advertising was displayed. This method provides a valuable marketing approach that integrates the design of distinctive products with the reuse of advertising material and in particular, with the reuse of advertising material with desirable subject matter that has been advertised on a billboard at a prominent location on specified dates. Heretofore, there has never been a connection between the attributes of original billboard advertising material and the merchandising of useful products as collectibles and/or a further promotion of the original advertising theme.

SUMMARY OF THE INVENTION

A method of reusing advertising material is described that comprises the steps of selecting a reused advertising material and selecting a product that includes the reused advertising material. The reused advertising material was previously displayed at a defined public location such as a billboard. The product includes a certification that identifies certain attributes of the reused advertising material included in the product. The attributes can include identifying the defined public location where the advertising material was displayed such as the location of the billboard that displayed the reused advertising material. The certification can also identify attributes such as the subject matter of the advertising material or the dates the advertising material was displayed at the defined location. The method can include the advertising material being suitable or adapted for display on a billboard. The certification can identify the attribute of an image on the reused advertising material that can be for example an animal, plant, symbol or logo. The certification can also identify the portion of the reused advertising material used in the making of or included in the product.

The selecting of a reused advertising material can include using a computer to access a website that has images of products made from the reused advertising materials and selecting the desired reuse product with the desired reused advertising material. The method also accommodates the custom making of the reuse product for an individual buyer. This method can include utilizing a website for allocating a specific portion of the advertising material for a design pattern that will be used in the making of the reuse product. The website accommodates selecting a reuse product and selecting a specific portion of the advertising material or advertising display material that will be used in the making of the product.

BRIEF DESCRIPTION OF THE DRAWINGS

These and other features, aspects and advantages of the present disclosure will become better understood with regard to the following description, appended claims and accompanying drawings where:

DETAILED DESCRIPTION OF THE INVENTION

Figure 1:
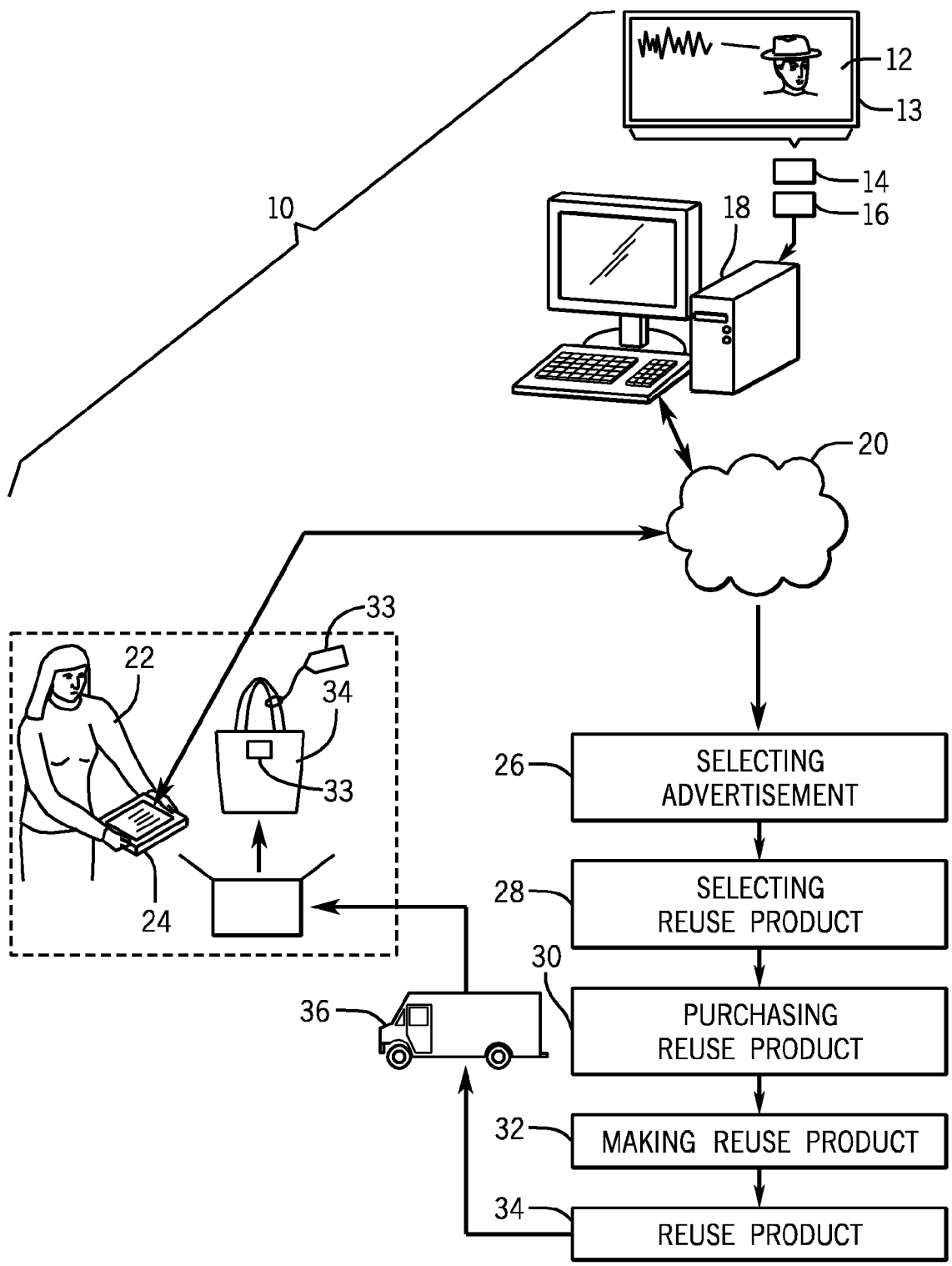
FIG. 1 is an idealized illustration and block diagram of a method of reusing advertising material for the making of products.

With reference to FIG. 1, a method of reusing advertising material 10 is shown that includes the reuse of advertising material 12 in the making or fabrication of various goods. The method further includes using select attributes of reused advertising material 12 to promote the goods. The method of reusing advertising material 10 has an environmental benefit of reusing advertising material or advertisement 12 in the making of useful goods.

Advertisement 12 has definable attributes that include a subject matter or theme, place or location of public display on billboard 13 and period of display on billboard 13. The subject matter of advertisement 12 can include, for example, the promotion of a popular movie, a good or a service. The location of the billboard 13 defines the location at which advertisement 12 was displayed. The time of display is the dates in which advertisement 12 was shown on billboard 13. The method of reusing advertising material 10 includes acquiring advertisement 14 after the display of advertisement 12 on billboard 13. An image 16 and one or more of the attributes of advertisement 12 are acquired, loaded into a computer 18 and selectively displayed on a reuse website 20.

A buyer 22 uses a computer 24 for accessing reuse website 20, selecting an advertisement 26, selecting a reuse product 28 and purchasing a reuse product 30. The making of a reuse product 32 includes reusing the actual advertisement 12 displayed on billboard 13 in the fabrication of reuse product 34. A certification 33 defines select attributes of advertisement 12 used to make reuse product 34. The transfer of the reuse product 34 to buyer 22 includes transportation 36 such as commercial transportation as well as other forms of transportation. It is understood buyer 22 can be a distributor, retailer or consumer of products 34.

Figure 2:
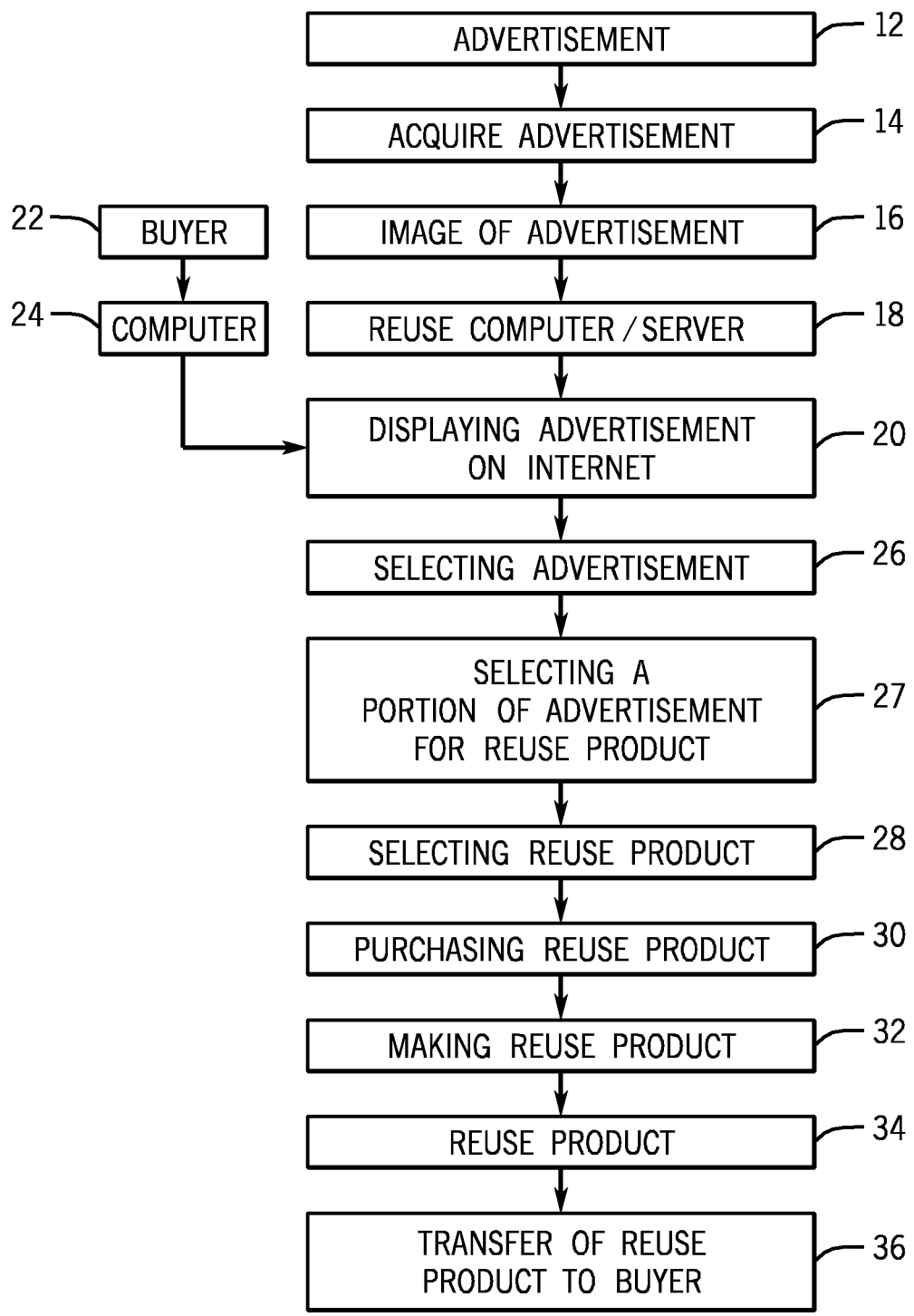
FIG. 2 is a block diagram of the method of reusing advertising material of FIG. 1.

Referring to FIG. 2, once advertisement 12 has completed its period of display on billboard 13, steps are taken to acquire advertisement 14. This can include acquiring advertisement 12 as discarded advertising material and/or the right to reuse advertisement 12 in products. This can further include documenting the location of billboard 13 that displayed advertisement 12 and the dates that advertisement 12 was displayed on billboard 13. The acquiring of advertisement 14 can be done by anyone or any entity.

Advertisement 12 is a flexible sheet of material. In the preferred embodiment, the material of advertisement 12 preferably includes a printing on a polyester weave with a PVC coating. Advertisements 12 can vary in size, but are typically large displays. For example, standard dimensions for advertisements 12 can include approximately twenty (20) by sixty (60) feet and approximately fourteen (14) by forty-eight (48) feet. Advertisements 12, however, can be custom made to any particular set of dimensions. In one preferred embodiment, advertisement 12 has a tensile strength between approximately 150 and approximately 170 lbs/in and tear strength of 66 lbs. Advertisement 12 can also have a permeable construction that allows airflow through the material. It is understood, however, that advertisement 12 can be made of any material suitable for display on a billboard.

Advertisement 12 has a defined subject matter that can be and/or can include an advertisement, a public announcement, a promotion, and/or a work of art. Advertisement 12 as a promotion commonly includes both images and text. Advertisement 12 is displayed or shown on billboard 13. Billboard 13 can take any structural form. For example, billboard 13 can include a frame or other structure that supports the display of advertising material 12. Billboard 13 can connect to an external structure, an independent structure and/or suspend advertisement 12 in air. Billboard 13 and/or advertisement 12 can be fixed in position or connected to a movable object.

The image of advertisement 16 preferably includes acquiring an image 16 of advertisement 12. Image 16 can be taken before, during or after display on billboard 13. Image 16 can also be a copy of the artwork for advertisement 12. Image 16 can initially be in any format, but is preferably taken in or converted to a digital image. Image 16 taken during display on billboard 13 can also be advantageously used on reuse website 20 and/or certification 33.

Image 16 of advertisement 12 is preferably loaded into reuse computer/server 18 and then displayed on reuse website 20 on the internet. Image 16 can be displayed on reuse website 20 to promote products 34, further the making of reuse products 34 as well as to assist in the selection of products 34 from advertisement 12. Reuse website 20 can be a portion of a website that is related to the subject matter of advertisement 12 or a separate website for the purchase of advertising reuse products, for example.

Buyer 22 connects to the internet-using computer 24 and accesses reuse website 18. Computer 24 can be any form of computer-based device that can provide access to the internet to include for example a cellular phone, tablet, laptop, desktop or server type computer configuration. Once on website 18, buyer 22 goes through a variety of steps that include selecting an advertisement 26 from one or more advertisements of a particular subject matter.

The selecting of the advertisement 26 can include selecting a particular advertisement 12 based on the subject matter of advertisement, 12, where advertisement 12 was displayed to include the specific location of billboard 13 and/or the dates when advertisement 12 was displayed on billboard 13 at a particular location. The subject matter of advertisement 12 can include for example advertising for products and/or services that include entertainment such as advertising for movies. The location of billboard 13 can be defined by any location identifier to include for example a locale such as Time Square in New York City, a community, a town, a street address and/or coordinates such as latitude and longitude.

Website 18 and/or its associated software programs are preferably constructed to accommodate buyer 22 selecting an advertisement and/or product 34 made with advertisement 12 by any parameter to include subject matter of the advertisement, date of display and/or the location of the billboard upon which advertisement 26 was displayed.

Once buyer 22 completes their selecting of advertisement 26 using one or more images 16 of advertisement 12 on website 18, buyer 22 then selects a portion of the selected advertisement for reuse product 27. This includes buyer 22 reviewing image 16 of the selected advertisement 12 and selecting a portion of that advertisement for a reuse product 27 design pattern.

In coordination with buyer 22 selecting a portion of advertising for reuse product 27, buyer 22 can also be selecting a reuse product 28. The selecting of a portion of advertising for reuse product 27 can be done manually or using an enhanced software process. The selecting of a portion of advertising for reuse product 27 can include buyer 22 selecting a portion such as a square of a lattice coordinate system imposed over image 16. In the enhanced software process, a software program assists buyer 22 in selecting a reuse product 28 on website 22. The enhanced software program process allows buyer 22 to overlay the design pattern for the selected reuse product 28 on their selected portion of image 16 of advertisement 12. The same or a related enhanced program can create and show buyer 22 an image of the selected reuse product 28 adorned with the selected portion of advertisement 12. Thus, buyer 22 can choose one or more portions of advertisement 12 for the reuse product 34 and evaluate in steps the application of the design pattern for that product and/or view an image of the reuse product as it would appear using the selected portion of advertisement 12. This then allows buyer 22 to view an image, select and purchase the most desirable one or multiple reuse products 34.

In addition, the enhanced process using software in association with computer 18 or another computer can track the selection of and remove and/or block out portions of advertisement 12 previously used for selecting reuse products 28. This process can include considerations as to application of design patterns for selecting reuse product(s) 28 on image 16 such as for example the different dimensional sizes design patterns required to manufacture a particular product 34 relative to the space available in the desired portion of advertisement 12. The software can assist buyer 22 in making the "best fit" for the given size of the pattern required for reuse product 34. Thus, the enhanced process assists buyer 22 in the manipulation of the design pattern for reuse product 34 on image 16 around previously purchased portions of advertisement 12 in order to assist buyer 22 is purchasing the most desirable portion of advertisement 12.

Buyer 22 preferably uses website 18 for purchasing the reuse product 30 using standard techniques for the communication of essential data for identification, payment and shipment of reuse product 34. The purchasing of reuse product 34 can be done by any means of communication to include for example by electronic mail, text or facsimile. Once buyer 22 makes payment, computer 18 removes the selected portion of advertisement 12 from viewing for future buyers 22.

The making of reuse product 32 preferably includes overlaying and cutting advertisement 12 using the design pattern for the reuse product 34 selected by buyer 22. As required, advertisement 12 is treated and/or processed into the desired form and/or shape. The making of reuse products 32 can further include attaching a label 33 that also functions as a certification of authenticity for the attributes of advertising material 12 used in making product 34. For example, reuse products 34 can include a certification as to the theme or subject matter of advertisement 12, images on advertisement 12, location of billboard 13 and dates of the display of advertisement 12 on billboard 13. The certification can also be used to promote certain types brands associated with or that originated advertisement 12.

Reuse product 34 can include goods in which portions of advertisement 12 are reused to construct bags, purses and beach related products such as ground covers, or the reverse sides of beach towels. In addition, reuse product 34 can include goods for personal adornment such as rings, necklaces, anklets and bracelets. Advertisement 12 is preferably connected and/or modified to define the shape and structure of product 34. The modifications can include the use of coatings, structural forms and/or other pieces of advertisement 12 to stiffen, provide define shapes and/or act as structural forms for product 34. Alternatively, product 34 can be an external layer on predefined structural form for product 34 such as a bracelet. Similarly, reuse products 34 can also include coverings for goods such as for example electronic devices in which advertisement 12 is reused as part of the décor of the device or a protective covering for the device. Product 34 can selectively include additional reusable materials that did not originate from advertisement 12 for functions such as a handle for a bag or purse and/or a structural form to define a desired shape of product 34.

The transfer of the reuse product to the buyer 36 can be by any appropriate transportation means. This includes being shipped using commercial transportation to buyer 22. Alternatively, buyer 22 can pick-up reuse product 34 at a designated site such as a designated retail location.

Figure 3:
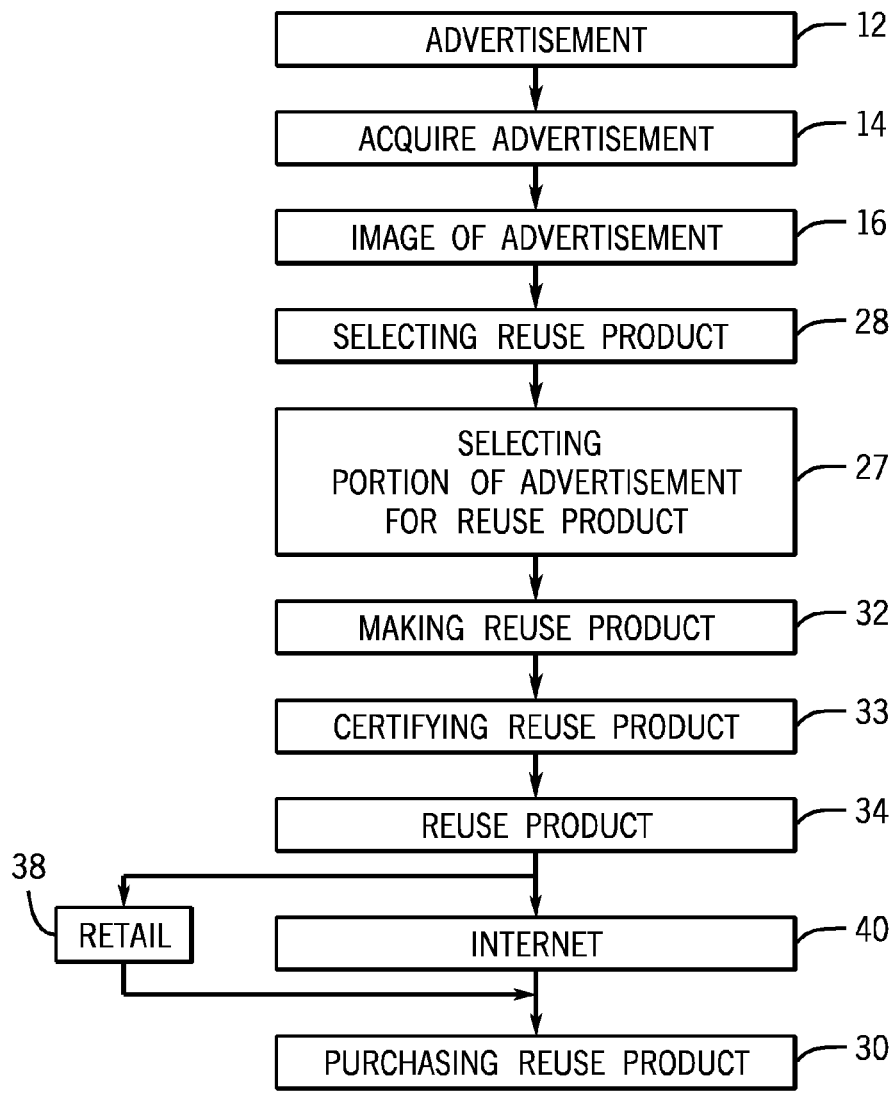
FIG. 3 is a block diagram of an alternative embodiment of the method of reusing advertising material of FIG. 2.

Referring now to FIG. 3, in this embodiment of the method of reusing advertising material 10 is directed towards the making of reuse products 32 for sale in retail 38 or an internet 40 marketplace. As described previously, one or more advertisements 12 were displayed on billboards 13 at specific locations for defined periods and then acquired 14 after removal. The image of advertisement 16 in this embodiment can include the actual advertisement 12 or digital image of each advertisement 16 that can be stored or displayed on or through computer 18 (See FIG. 1).

The selecting of reuse product 28 in this embodiment can include selecting reuse product 28 from a group of one or more products 34. The selecting of a portion of advertisement for reuse products 27 in conjunction with selecting reuse product 28 can take into account many factors that include the demand for different reuse products 34, the size of the design layout of the different products 34, the distinctive images or identifying marks of a particular advertisement 12 and/or the size of the distinctive images or identifying marks on advertisement 12. As noted previously, advertisements 12 can have large dimensions that are in many instances substantially larger than many reuse products 34. In many instances, however, the size of products 34 can include at least a portion of a distinctive image or identifying mark to be an attractive element for marketing.

The selecting of a portion of advertisement for reuse product 27 and the laying out of design patterns in coordination with selecting reuse product 28 can also take a variety of sequences in order to create the desired consumer appeal for products 34. For example, a popular product 34 may drive the selecting of one advertisement 26 (See FIG. 1) and selecting of a portion of the advertisement for the reuse product 27 that advantageously emphasizes the display of that portion of advertisement 12 on that product 34. Similarly, the popularity of one advertisement 12 may drive the selecting a portion of advertisement for reuse product 27 that emphasizes smaller sized products 34 in order to increase the quantity of products 34 per advertisement 12.

In this regard, the laying out of patterns using computer 18 on image of advertisement 16 can advantageously accommodate the digital placement of design patterns on the image of advertisement 16. Through the additional use of computer 18, this in turn can enable the creation of a digital virtual representation of the selected portion of the advertisement for reuse product 27 onto product 34 by integrating digital images of the design patterns cut from portions of advertisement 12 onto digital images of products 34. This virtual representation can also be an alternative displaying advertisement on the internet 40 in advance of making reuse product 32.

The making of reuse products 32 includes identifying the products 34 to make from a given advertisement 12. The making of reuse products 32 includes the manual or an automated layout of design and cutting of those designs for products 34. This can include using a separate or the same computer 18. The layout of the design patterns preferably positions select portions of advertisement 12 for prominent positioning on products 34. The making of reuse product 32 also includes connecting a certification 33 to each product 34.

This embodiment of the method of reusing advertising material 10 also includes advertising the different reuse products 34 on internet 40 and/or other forms of advertising promotion. Similarly, the purchasing of reuse product 30 can include shopping for reuse products 34 on internet 40 or at select retail outlets 38. The purchasing of reuse product 30 can similarly be purchases of reuse products 34 over internet 40 or in retail 38 stores.

Figure 4:
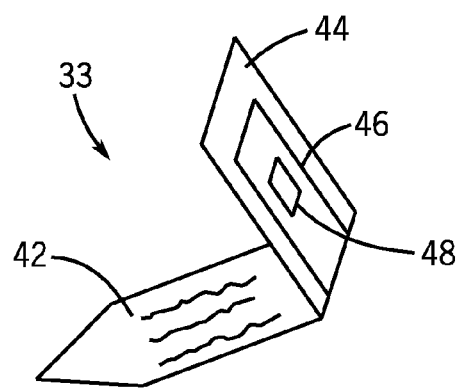
FIG. 4 is an idealized illustration of a label for a reuse product of the method of reusing advertising material of FIG. 1.

Referring now to FIG. 4, the label or certification 33 for reuse product 34 includes in this one preferred embodiment a first side 42 and a second side 44 that is opposed to first side 42. Certification 33 includes information on advertisement 12 such as one or more of the attributes that include subject matter or theme of advertisement 12, a representation of advertisement 12, the location of billboard 13 (See FIG. 1) where advertisement 12 was displayed and the dates when advertisement 12 was shown at the location of billboard 12. Certification 33 can also include numbers, images, symbols to include coded images that can be scanned and/or marks to authenticate product 34. In addition, background information regarding the subject matter or theme of advertisement 12 can also be provided such a history or associations in advertisement 12, for example.

In one preferred embodiment at least one or more of the subject matter of advertisement 12, location of billboard 12 and dates when advertisement 12 was shown is positioned on first side 42. Second side 44 preferably includes an image of advertisement 12 and an identification of the portion of advertisement 12 used in the making of reuse product 32. Alternatively, second side 44 can include an identification number or for example, coordinates that can be related back to advertisement 12 with a coordinate system to identify the portion of advertisement 12 used or reused to make product 12. It is understood that certification 33 can take any form in that all of the above information can be represented in a single sided presentation on and/or connected to product 34. Further, some aspects of certification 33 can be located on or include references to information on website 18.

In the preceding specification, this disclosure has described specific exemplary embodiments. It will be evident, however, that various modifications, combinations and changes can be made thereto without departing from the broader spirit and scope of the invention as set forth in the claims that follow. In addition, it is understood that while the methods described herein are in a series of steps, the arrangement of those steps can be varied within the scope of the invention. Similarly, while the present invention is described in terms of a series of embodiments, the present invention can combine one or more novel features of the different embodiments. The specification and drawings are accordingly to be regarded in an illustrative manner rather than a restrictive sense.

In addition, those skilled in this art will appreciate the conception upon which this disclosure is based in that this disclosure may be utilized as a basis for designing other products for carrying out the several purposes of the present invention. It is important that the claims be regarded as including equivalent constructions insofar as they do not depart from the spirit and scope of the present invention as defined in the appended claims.

What is claimed is:

1. A method of reusing advertising material comprising the steps of:
    displaying an image of a reused advertising material on an internet website and a buyer selecting a portion of the reused advertising material on the website, the reused advertising material previously an advertising material adapted for and displayed on a billboard; and
    displaying an image of one or more products on the website and a buyer selecting a product from the one or more products on the website, the selecting a product including selecting the portion of reused advertising material to be used in making the selected product, the reused advertising material cut and connected and included in the structure of the selected product, the products include at least one of a beach related product, a bag, purse, a ring, a necklace, a bracelet or an anklet.

2. The method of reusing advertising material of claim 1, wherein the step of selecting a product further includes the buyer using the website for the selecting the portion of the reused advertising by overlaying an image of a design pattern of the selected product on the image of the reused advertising material.

3. The method of reusing advertising material of claim 1, wherein the step of selecting a product further includes a certification, the certification attached to the selected product and identifying one or more of the attributes of the reused advertising material, the attributes displayed on the internet and the attributes including identifying the defined public location of the billboard where the advertising material was displayed, identifying the attribute of the date when the advertising material was displayed at the defined location or the subject matter of the reused advertising material, the certification optionally identifying the location of the billboard where the advertising material was displayed by at least one of a street address or geographic coordinates, the certification optionally including an image of the reused advertising material that identifies the location of the selected portion of reused advertising material on the image of the reused advertising material.

4. The method of reusing advertising material of claim 1, wherein the step of selecting a reused advertising material on the website further includes the website tracking the selected portions and the website blocking out a previously selected portion from the image of the reused advertising material.

5. The method of reusing advertising material of claim 4, wherein the step of selecting the reused advertising material further includes a second buyer using the website for the selecting of the reused advertising material from one or more images of the reused advertising material displayed on the website, the second buyer using the website for selecting a product from the group of one or more products displayed on the website, the selecting of the reused advertising material including the second buyer identifying a second portion of the reused advertising for the product selected by the second buyer, the second portion different from the portion previously selected by the buyer on the website, the website blocking the selection of the previously selected portion.

6. The method of reusing advertising material of claim 1, wherein the step of selecting a product further includes the buyer choosing one or more portions of the reused advertising material for the selected product.

7. The method of reusing advertising material of claim 1, wherein the step of selecting the product further includes selecting goods for personal adornment and coverings for goods, the coverings for goods including at least one of using the reused advertising material as part of a décor or as a protective covering.

8. The method of reusing advertising material of claim 1, wherein the website further includes making a virtual representation of the product by virtually cutting portions of the image of the reused advertising material using the design pattern into a virtual image of the product.

9. The method of reusing advertising material of claim 1, wherein the products further include goods for personal adornment and coverings for goods, the coverings for goods including at least one of using the reused advertising material as part of a décor or as a protective covering.

10. A method of reusing advertising material comprising the steps of:
    selecting a reused advertising material, the selecting including a buyer using a computer for accessing a website and selecting a reused advertising material from a display of reused advertising materials on the website, the website providing one or more attributes of the reused advertising material, the attributes including a defined subject matter, a defined date of display and a defined location where the reused advertising material was displayed, the reused advertising material previously an advertising material adapted for displaying on a billboard, the advertising material having been displayed at the defined public location on the billboard; and
    selecting a product, the selecting including the buyer selecting a product from a group of one or more products on the website, the selecting of the product further including selecting one or more portions of the reused advertising material on the website for the making of the product and cutting and connecting the reused advertising material into the selected product, the product including the portion of reused advertising material in the product and a certification, the product includes at least one of a bag, a purse, a beach related product, articles of personal adornment, a protective covering, a ring, a necklace, a bracelet or an anklet, the certification identifying one or more of the attributes of the reused advertising material that include identifying the attributes of the subject matter of the reused advertising material, the date the advertising material was displayed and the defined public street location of the billboard where the advertising material was displayed, the certificate attached to the product.

11. The method of reusing advertising material of claim 10, wherein the step of selecting the product further includes selecting the portion of the reused advertising material to be used in making the product, the selecting of the portion of the reused advertising material includes using a design pattern of the selected product to identify the selected portion of the reused advertising material and cutting the reused advertising material, the certification identifying the portion of the reused advertising material used in making the product.

12. The method of reusing advertising material of claim 10, wherein the step of selecting the product further includes the buyer using the website to make a virtual representation of the product by virtually cutting the one or more portions of the images of the reused advertising material using the design pattern into a virtual image of the product.

13. The method of reusing advertising material of claim 10, wherein the step of selecting the portion of the reused advertising material includes constructing the one or more selected portions of the reused advertising material into the structure of the selected product.

14. The method of reusing advertising material of claim 10, wherein the step of selecting the product further includes the certification identifying the attribute of an image on the reused advertising material and the position of a design pattern of the selected product on the selected portion of the image reused advertising material.

15. The method of reusing advertising material of claim 10, wherein the step of selecting the reused advertising material includes the website tracking the selection of portions of the reused advertising material and the website identifying portions of the reused advertising material previously selected and the website blocking out previously selected portions of the reused advertising material.

16. A method of reusing advertising material comprising the steps of:
   selecting a reused advertising material from one or more images of reused advertising materials on the internet, the selecting including a buyer using a computer to access a website and reviewing the image of the reused advertising material and selecting a portion of the reused advertising material on the website, the reused advertising material having defined attributes identified on the website, the selected reused advertising material previously an advertising material adapted for displaying on a billboard, the selecting of the reused advertising material can further include selecting the reused advertising material based on one or more of the attributes of the reused advertising material that include the date when the reused advertising material was displayed on the billboard, the location where the reused advertising material was displayed or the subject matter of the reused advertising material;
   providing the dates when the reused advertising material was displayed on a billboard and at a location of the billboard on the website;
   providing the location that defines where the advertising material was displayed on the billboard on the website; and
   selecting a product from one or more products on the website, the selecting a product including the buyer using the website to select the portion of the reused advertising material, the selecting the portion of the reused advertising including the website allocating a portion of the reused advertising material for a design pattern and the buyer overlaying an image of the design pattern of the selected product on the image of the reused advertising material, cutting the selected portion of the reused advertising material using the design pattern of the product and connecting the selected portion of the reused advertising material into the selected product, the product including the reused advertising material and a certification, the product design including at least one of a bag, a purse, a ring, a necklace, a bracelet, a beach related product, a protective covering, an article of personal adornment or an anklet, the certification identifying attributes of the reused advertising material that include identifying one or more of the attributes of the reused advertising material, the certificate attached to the product.

17. The method of reusing advertising material of claim 16, wherein the step of selecting the product further includes the buyer using the website for the positioning of the design pattern of the selected product on the selected portion of the reused advertising material, the buyer using the website to create a virtual representation of the product based on the position of the design pattern on the selected portion of the reused advertising material.

18. The method of reusing advertising material of claim 16, wherein the step of selecting the reused advertising material further includes the buyer selecting the reused advertising based on one or more of the attributes of the reused advertising material, the buyer identifying a portion of the reused advertising material for the making of the selected product, the making of the selected product including the use of a design pattern for the cutting of the reused advertising material, the selected product constructed of the selected portion of the reused advertising material.

19. The method of reusing advertising material of claim 16, wherein the step of selecting the product further includes the certification located on the product and the certification identifying one or more of the attributes of the reused advertising material to include a street address that is the defined public location of the location where the reused advertising material was displayed.

20. The method of reusing advertising material of claim 16, wherein the step of selecting the portion of the reused advertising material by the buyer further includes the website tracking and blocking out each selection of a portion of the reused advertising material by each buyer.

\* \* \* \* \*